United States Patent [19]

Gilbert, Jr.

[11] 4,019,870

[45] Apr. 26, 1977

[54] AIR POLLUTION CONTROL OF OXIDES OF NITROGEN

[75] Inventor: William J. Gilbert, Jr., Manville, N.J.

[73] Assignee: Croll-Reynolds Company, Inc., Westfield, N.J.

[22] Filed: Sept. 10, 1975

[21] Appl. No.: 612,198

Related U.S. Application Data

[60] Division of Ser. No. 545,791, Jan. 31, 1975, Pat. No. 3,949,057, which is a continuation-in-part of Ser. No. 327,412, Jan. 29, 1973, abandoned.

[52] U.S. Cl. ............................... 23/288 F; 23/283; 23/288 R
[51] Int. Cl.² .................... B01J 8/00; B01J 35/04
[58] Field of Search ....... 23/288 F, 288 R, 288 FB, 23/283, 284, 285; 252/472, 477 R

[56] References Cited

UNITED STATES PATENTS

| | | | |
|---|---|---|---|
| 2,138,153 | 11/1938 | Grisdale | 23/288 F UX |
| 2,424,248 | 7/1947 | Melvill | 23/288 R X |
| 2,490,079 | 12/1949 | Melvill | 261/94 |
| 2,615,699 | 10/1952 | Dixon | 261/101 |
| 2,856,259 | 10/1958 | Bollinger | 23/288 R X |
| 3,713,783 | 1/1973 | Greipel | 23/288 F |

Primary Examiner—Joseph Scovronek
Attorney, Agent, or Firm—Hammond & Littell

[57] ABSTRACT

Apparatus for removing nitrogen oxides from a gaseous mixture containing the same as well as oxygen comprising a vessel containing a knitted wire mesh packing material of stainless steel containing at least 8% Ni and having a diameter of from 0.003 to 0.015 inches, means for countercurrent washing said knitted wire mesh, means to introduce said gaseous mixture and means to maintain a residence time of 3.5 to 15 seconds.

2 Claims, 2 Drawing Figures

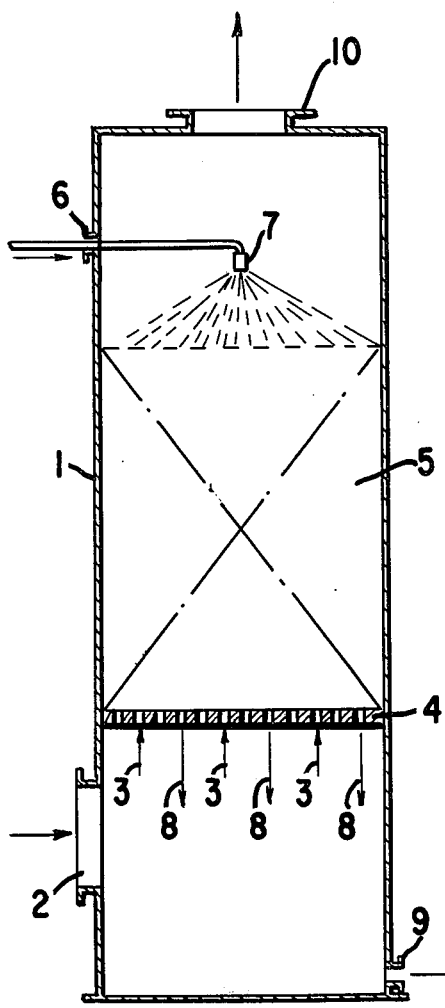
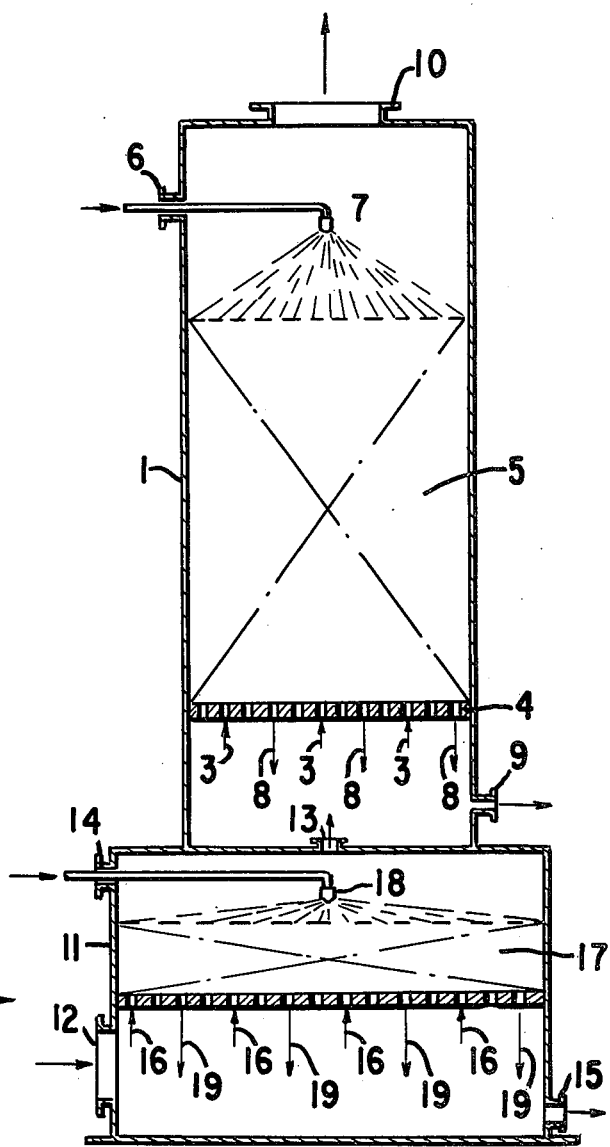

AIR POLLUTION CONTROL OF OXIDES OF NITROGEN

REFERENCE TO A PRIOR APPLICATION

This application is a division of my copending application Ser. No. 545,791, filed Jan. 31, 1975, now U.S. Pat. No. 3,949,057, which was a continuation-in-part of my copending application Ser. No. 327,412, filed Jan. 29, 1973, now abandoned.

THE PRIOR ART

In various industrial processes involving chemical reactions which produce, as waste products, low concentrations of nitrogen oxides of less than 1% by volume, these oxides, due to the high state of dilution involved, have been removed from the stack gases only with great difficulty and, in many instances, their removal has not been accomplished. Accordingly, there has necessarily been a discharge of such streams to the atmosphere, as waste gas, with accompanying pollution problems that arise from the residual nitrogen oxide components.

Various methods have been advanced for the separation of nitrogen oxides from streams of the kind hereinabove discussed. U.S. Pat. No. 1,559,292 discloses scrubbing nitrogen peroxide and nitrogen trioxide in a tower in the presence of water or a weak acid solution. U.S. Pat. No. 1,912,833 discloses the treating of sulfuric acid with alkali materials, such as hydroxide, carbonate, or bicarbonate, to remove any nitrogen-oxygen compounds contained therein by contacting the sulfuric acid with the scrubbing solution in a packed tower, though the specific packing medium is not disclosed. U.S. Pat. Nos. 2,288,091 and 2,309,845 disclose the scrubbing of nitrogen dioxide with water and caustic solutions. U.S. Pat. No. 3,034,854 discloses the scrubbing of nitrogen dioxide through the use of an alkaline suspension containing at least one member from among magnesium hydroxide, magnesium carbonate, and basic magnesium carbonate in which the scrubbing can be performed in countercurrent fashion in a scrubbing tower. U.S. Pat. No. 3,044,844 discloses the scrubbing of nitrogen oxides in countercurrent fashion with certain specific electron donor materials such as alkyl phosphates, aryl phosphates, alkyl sulfoxides, and alkyl phosphoramides in an absorption column packed with Heligrad type packing supported on a steel screen. U.S. Pat. Nos. 3,329,478, 3,565,575 and 3,658,472 describe processes of removing nitrogen oxides from gases produced in nitric acid plants. These processes employ gases which contain far more nitrogen oxides therein than is contemplated in the removal of less than 1% by volume of nitrogen oxides from waste gases.

The disadvantages of these known methods are manifold. In the water absorption method, the most widely used, the absorption has required a relatively high nitrogen oxide pressure for efficient operation, the chief reaction involving that of nitrogen dioxide with water and oxygen to form nitric acid. Because only nitrogen dioxide can be dissolved in water, it is necessary that the nitric oxide be oxidized to $NO_2$, which offers some difficulty in effecting removal of the NO component. Although water can be used at lower pressures, the rate of absorption is so low and the equilibrium is so unfavorable as to require excessively high time and/or equipment requirements in order to provide the necessary capacity in any given situation. Absorption of nitrogen oxides on silica gel demands that the nitrogen oxide-containing gas be dry. Dehydration of these gases is time consuming and uneconomical. Further, the silica must be dried, cooled and heated in each cycle of the process.

In the absorption of oxides from residual streams, e.g., waste gas streams of the type above discussed, absorption of the oxides in an aqueous base to form a salt is undesirable both from the standpoint of low value of the salts produced and also the low rate of the reaction involved. Sulfuric acid absorption is disadvantageous particularly inasmuch as water, invariably present when the gas is treated, causes deconcentration of the acid which, in view of need for reconcentration, poses a question of economics. Halogenated solvents also exhibit low solvent power and are in most instances uneconomical. In the scrubbing process utilizing specific electron donor materials, these materials usually contain phosphates and are themselves a source of water pollution.

U.S. Pat. Nos. 2,490,079, 2,615,699, 2,921,776, 3,218,048 and 3,243,170 broadly disclose the use of wire mesh packing in separation towers for gas/liquid contact. HOwever, none of these references discloses this type of packing for use in the scrubbing of nitrogen oxides.

OBJECTS OF THE INVENTION

It is an object of the present invention to provide a process for removing nitrogen oxides from a gaseous mixture containing oxygen and nitrogen oxides by contacting said mixture with an aqueous liquid in the presence of a metallic knitted wire mesh packing material.

It is a further object of the present invention to provide a process for removing nitrogen oxides from a waste gaseous mixture containing oxygen and up to 1% by volume of nitrogen dioxide and/or nitrogen oxide comprising adjusting the oxygen concentration of said mixture at least ten times greater than the nitrogen oxides concentration of said mixture, contacting said mixture with a liquid selected from the group consisting of water and dilute aqueous alkaline solutions, said liquid having a flow rate of from 10 to 60 gallons per thousand cubic feet per minute of said gaseous mixture, in the presence of a knitted wire mesh packing material of stainless steel containing at least 8% Ni and having a diameter of from 0.003 to 0.015 inches, said packing material having from 180 to 800 square feet of surface area per cubic foot of volume and maintaining a residence time of from 3.5 to 15 seconds for said gaseous mixture to be in the presence of said packing material.

These and further objects of the present invention will become apparent as the description thereof proceeds.

DESCRIPTION OF THE INVENTION

The present invention is directed to a process for removing nitrogen oxides from a waste gaseous mixture containing oxygen and up to 1% by volume of nitrogen dioxide and/or nitrogen oxide, comprising adjusting the oxygen concentration of said mixture at least 10 times greater than the nitrogen oxides concentration of said mixture, countercurrently contacting said mixture with a liquid selected from the group consisting of water and dilute aqueous alkaline solutions, said liquid having a flow rate of from 10 to 60 gallons per minute per thousand cubic feet per minute of said gaseous mixture, in the presence of a knitted wire mesh packing material of stainless steel containing at least 8% Ni and having a diameter of from 0.003 to 0.015 inches, said packing material having from 180 to 800 square feet of surface area per cubic foot of volume, and maintaining a residence time of from 3.5 to 15 seconds, preferably 3.5 to 6 seconds, for said gaseous mixture to be in the presence of said packing material.

The present invention is also directed to a development in the process for removing nitrogen dioxide and/or nitrogen oxide from a mixture of gases containing oxygen and up to 5000 ppm of nitrogen oxides which comprises contacting said mixture of gases with an aqueous liquid in the presence of a packing material, wherein the improvement comprises maintaining an oxygen concentration in said mixture of waste gases of at least 10 times greater than the nitrogen oxides concentration of said mixture, providing a countercurrent liquid flow rate of from 10 to 60 gallons per minute per thousand cubic feet per minute of said gaseous mixture, utilizing as said packing material a stainless steel metallic knitted wire mesh packing material having a nickel content of at least 8% and a diameter of from 0.003 to 0.015 inches, and having from 180 to 800 square feet of surface area per cubic foot of volume, and maintaining a residence time of from 3.5 to 15 seconds, preferably 3.5 to 6 seconds, for said gaseous mixture of gases to be in the presence of said packing material.

The use of the knitted wire mesh packing material of stainless steel containing at least 8% Ni and having a diameter of from 0.003 to 0.015 inches is critical to effecting the necessary conversion of NO to $NO_2$ in the space-time relationships involved. Moreover, the corrosion of the packing material is minimal. All types of stainless steels containing at least 8% Ni can be employed which can be drawn to the necessary diameter and formed into knitted packing material, such as type 316 stainless steel or 18-8 stainless steel.

In addition, the present invention is directed to an apparatus for removing nitrogen oxides from a gaseous mixture of waste gases containing oxygen and up to 5000 ppm of nitrogen oxides comprising means for maintaining the oxygen concentration of said gaseous mixture at least ten times the nitrogen oxides concentration of said gaseous mixture, a vessel containing a knitted wire mesh packing material of stainless steel containing at least 8% Ni and having a diameter of from 0.003 to 0.015 inches, said packing material having from 180 to 800 square feet of surface area per cubic foot of volume, means for supplying a liquid selected from the group consisting essentially of water and dilute aqueous alkaline solutions at a flow rate of from 10 to 60 gallons per minute per thousand cubic feet per minute of said gaseous mixture to the upper surface of said packing material, means for supplying said gaseous mixture to the lower surface of said packing material, and means for maintaining a residence time of from 3.5 to 15 seconds, preferably from 3.5 to 6 seconds, for said gaseous mixture to be in the presence of said packing material.

THE DRAWINGS

The description of the present invention will be illustrated by reference to the drawings in which:

FIG. 1 is a partial section view of the liquid/gas contact apparatus of the present invention; and FIG. 2 is a partial section view of the apparatus of FIG. 1, in which there is a pre-cleansing scrubber in combination therewith.

In FIG. 1, the initial gas mixture to be purified enters scrubbing apparatus 1 through the inlet means 2, such as conduits and valves. Nitrogen dioxide and/or nitrogen oxide are present in this initial gas mixture usually in concentrations of up to 10,000 ppm, parts per million, preferably from 50 to 5,000 ppm. The initial gas mixture usually contains atmospheric air for economical reasons which contains about 20% by volume oxygen. This gas mixture need not necessarily be air, but may be any oxygen containing gas used in sufficient concentration so that oxygen concentration is at least ten times greater than the NO and/or $NO_2$ concentration. This mixture could be the waste stack gas from an industrial process. If additional oxygen is needed to increase the oxygen concentration of the initial gas mixture, supplemental oxygen may be added by gas injection means (not shown) such as tanks of compressed oxygen, or air, or ozone may be added thereto.

After the gas enters the low portion of the scrubber, it flows upward in the direction shown by arrows 3 through the perforated support means 4, which may be a perforated stainless steel plate. This plate supports the packed bed 5, which ranges from a minimum normal height of 6 feet to a maximum normal height of 12 feet.

The packed bed 5 contains a high efficiency knitted metallic wire mesh packing material comprising preferably 316 stainless steel or 18-8 stainless steel. The size of the wire used in the packing has a diameter ranging between 0.003 inches to 0.015 inches. The packing material is constructed so as to provide from 180 to 800 square feet of surface area per cubic feet of volume of the packing material.

An aqueous liquid stream enters the top portion of the scrubber through liquid inlet means 6 and is conducted to nozzle means 7 which distributes the liquid in a pattern across the cross-section of the packed bed, as shown by FIG. 1. The liquid flows downward by gravity flow as indicated by the direction of arrows 8 countercurrent to the gas flow. Suitable examples of liquids are water or very dilute aqueous alkaline solution, such as aqueous alkali metal hydroxide solutions, preferably sodium hydroxide. The ratio of the liquid flow rate to the gas flow rate is from 10 to 60 gallons per minute of liquid per thousand cubic feet per minute of gas to be scrubbed. After the liquid has cleaned the gas, it is conducted out of the scrubber through liquid outlet means 9. Then the purified air leaves the scrubber through gas outlet means 10.

The residence time of the gas inside the packed bed is an important factor in obtaining the high efficiencies of the present process. Residence time should preferably be between 3.5 to 6 seconds depending upon the concentration of nitrogen dioxide in the initial gas mixture. The residence time is required since nitrogen dioxide reacts with water to form nitric acid and additional amounts of nitrogen oxide (NO). This NO must then react with oxygen from the air to form $NO_2$. The reaction usually proceeds very slowly; however, it has been found that the presence of the extended metal surface packed bed in the tower has a catalytic effect upon this reaction. The metal surface enables the NO to rapidly react with the oxygen present to form $NO_2$ which is the only soluble component.

The reactions occurring in the packed bed are as follows:

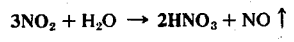

$$3NO_2 + H_2O \rightarrow 2HNO_3 + NO \uparrow$$

and $$2NO + O_2 \rightarrow 2NO_2$$

It can be seen that the reaction of $NO_2$ with water in a packed tower is written as 3 moles of $NO_2$ plus one mole of water producing 2 moles of nitric acid plus one mole of NO. The NO being insoluble and colorless would then escape from the liquid phase into the gas phase wherein it would slowly reoxidize to $NO_2$ due to the excess of oxygen in the air, according to the present methods. Based on this equation, the known prior art maximum removal of $NO_2$ from air would be 66% if the NO does not reoxidize. According to the present process, the total removal of all oxides of nitrogen is in the high 90% range, up to 99%, under actual operating conditions.

It is believed that this high efficiency resulted from the residence time within the scrubbing tower being sufficient to allow the catalytic effect of the stainless steel packing to reoxidize the NO to $NO_2$.

While liquid other than water could be used as the scrubbing medium, no appreciable increase in efficiency results. Other liquids could be used when a recycle system is necessary for control of water pollution. The mechanism for removal of the $NO_2$ would not vary in those cases, but once the $NO_2$ was successfully dissolved as nitric acid, it would react with a dilute sodium hydroxide solution or with other alkaline media to form a neutral salt.

The concentration of oxygen in the inlet gas stream must be a minimum of 10 times the $NO_2$ concentration at the gas inlet. Greater concentrations of oxygen will not affect the efficiency but lesser concentrations will generally lower the removal of oxides of nitrogen. Ozone can be injected to compensate for low oxygen concentration or to increase efficiency if necessary.

Due to the residence time and nature of the packing, an additional advantage of this type of scrubbing device is the relatively low pressure drop encountered, normally from 3 inches to 7 inches water gauge. This relatively low pressure drop is in addition to the very highly efficient removal of the nitrogen oxides from the gas stream.

FIG. 2 shows precleaning scrubber apparatus 11 having gas inlet means 12, such as a conduit and valve, for admitting the initial gas mixture and gas outlet means 13 through which the gas mixture flows into the apparatus of FIG. 1. A liquid, for example water or a dilute aqueous alkaline medium, such as sodium hydroxide, enters the precleaning apparatus through liquid inlet means 14, such as a conduit and valve, and is discharged therefrom through liquid outlet means 15.

The gas flows upward as indicated by the direction of arrows 16 into the plastic packing material of packed bed 17 in order to remove water soluble acid gases, such as HCl and $SO_2$, before removing the nitrogen oxides per se in scrubber 1. The liquid which enters the precleaner at inlet 14 flows to nozzle means 18 wherein it is distributed in a spray pattern across the width of the packed bed, as shown by FIG. 2. The liquid flows downward by gravity flow as indicated by the direction of arrows 19 and counter-current to the gas flow.

The following examples are merely illustrative of the present invention without being deemed limitative in any manner thereof.

EXAMPLE 1

Referring to FIG. 1, 35 cubic feet/minute of air initially containing 5000 ppm $NO_2$ contaminant was introduced into the scrubber. The contaminated air flowed into a packed bed 9 feet in height and 6 inches in diameter containing knitted wire mesh packing material comprising 316 stainless steel wires having a diameter of 0.008 inches. The packing material provided about 500 square feet surface area per cubic foot volume, so that there was approximately 180 cfm of gas per square foot of cross sectional surface of the packing material. Simultaneously therewith water was introduced into the scrubber at a flow rate of 8 gallons per minute per square foot of cross section of the packing material. After a residence time of about 5 seconds, the level of contaminants in the air had been lowered to 30 ppm NO and 20 ppm $NO_2$. The temperature throughout the scrubber was ambient conditions, 20° to 25° C. The gas pressure drop across the scrubber was 3.5 inches water gauge.

EXAMPLE 2

Utilizing a procedure identical to that described in Example 1, air initially contaminated with 500 ppm $NO_2$ was cleansed in the scrubber, whereby the level of contaminants was reduced to 6 ppm NO and 4 ppm $NO_2$.

EXAMPLE 3

Referring to FIG. 2, 35 cubic feet/minute of air initially containing 5000 ppm of $NO_2$ and 3000 ppm of HCl vapor contaminants was introduced into the precleaning scrubber apparatus. The contaminated air flowed into a packed bed 3 feet in height containing packing material comprising polypropylene plastic. The packing material provided about 150 square feet of surface area per cubic foot volume, so that there was approximately 180 cfm of gas per square foot of cross sectional surface area of the packing material. Simultaneously therewith, water was introduced into the scrubber at a flow rate of 4 gallons per minute per square foot of cross section of the packing material. After a residence time of about 2 seconds, the level of contaminants in the air had been lowered to 4800 ppm $NO_2$ and essentially no HCl vapor (i.e., unmeasurable) since more than 99% HCl had been removed. The temperature was maintained between 20° to 25° C throughout the precleaning apparatus.

The precleaned gas mixture effluent from the precleaning scrubber flowed into the scrubbing device having the dimensions and containing the packing material of Example 1. Utilizing the identical liquid and gas flow rates and after a residence time of about 5 seconds, the level of contaminants in the air had been lowered to 30 ppm NO and 20 ppm $NO_2$. The temperature throughout the scrubber was about 20° to 25° C and the pressure drop across the scrubber was 3.5 inches water gauge.

EXAMPLE 4

Utilizing a procedure identical to that described in Example 3, air initially contaminated with 500 ppm $NO_2$ and 3000 ppm HCl vapor was cleansed in the precleaning scrubber apparatus, so that the level of contaminants was reduced to 480 ppm $NO_2$ and essentially no HCl vapor (i.e., unmeasurable).

The precleaned gas mixture effluent from the precleaning scrubber flowed into the scrubbing device having the dimensions and containing the packing material of Example 1. Utilizing the identical liquid and gas flow rates and after a residence time of about 5 seconds, the level of contaminants in the air had been lowered to 6 ppm NO and 4 ppm $NO_2$. The temperature throughout the scrubber was about 20° to 25° C and the pressure drop across the scrubber was 3.5 inches water gauge.

EXAMPLE 5

With Comparisons

Referring to FIG. 1 of the application, 35 cubic feet/minute of air initially containing 500 ppm $NO_2$ and 40 ppm NO contaminants were introduced into the scrubber. The contaminated air flowed into a packed bed 9 feet in height and 12 inches in diameter containing various types of packing material as follows:

I. — Type 316 stainless steel 1 inch pall rings providing about 63 square feet surface area per cubic foot of volume.

II — Polypropylene 1 inch "Tellerettes" providing about 55 square feet surface area per cubic foot of volume.

III — Type 316 stainless steel 1 inch rashing rings providing about 62 square feet of surface area per cubic foot of volume.

IV — Type 434A stainless steel "Goodloe" packing having a diameter of 0.005 inches, providing about 585 square feet surface area per cubic foot of volume. Type 434A stainless steel consists approximately of 0.03% C; 0.54% Mn; 0.034% P; 0.52% Si; 14.6% Cr; 0.64% Cu; Balance Fe.

V — Type 316 stainless steel "Goodloe" packing having a diameter of 0.005 inches providing about 585 square feet surface area per cubic foot of volume. Type 316 stainless steel consists approximately of 45.9% Fe; 18% Cr; 11% Ni; 25% Mo and 0.1% max C.

Simultaneously therewith water was introduced into the scrubber at a flow rate of from 0.5 to 3 gallons per minute depending on the type of packing to give a flow rate of 0.0065 gallons per minute, per square foot of surface area of the packing material.

After a residence time of about 12 seconds, the level of contaminants in the air was lowered as follows:

| Packing | Total Nitrogen Oxides as NO in ppm | % Reduction |
|---|---|---|
| I | 220 | 59.2 |
| II | 214 | 60.4 |
| III | 225 | 58.3 |
| IV | 198 | 63.3 |
| V | 81 | 85.0 |

These results demonstrate the criticality of the use of a packing material consisting of knitted wire mesh of stainless steel containing at least 8% Ni and having a diameter of from 0.003 to 0.015 inches.

Although the present invention has been disclosed in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

I claim:

1. An apparatus for removing nitrogen oxides from a gaseous mixture of waste gases containing oxygen and nitrogen dioxide and nitrogen oxide, said gaseous mixture of waste gases containing up to 1% by volume of nitrogen oxides and an oxygen concentration of at least ten times greater than the nitrogen dioxide and nitrogen oxide concentration, comprising a vessel having gas inlet and gas outlet means and inlet and liquid outlet means and containing a knitted wire mesh packing material of stainless steel containing at least 8% Ni and having a diameter of from 0.003 to 0.015 inches, said packing material having from 180 to 800 square feet of surface area per cubic foot of volume, means for supplying to the vessel a liquid selected from the group consisting essentially of water and dilute aqueous alkaline solutions at a flow rate of from 10 to 60 gallons per minute per thousand cubic feet per minute of said gaseous mixture evenly to the upper surface of said packing material, means for supplying said gaseous mixture to the lower surface of said packing material, the volume of said packing material in said vessel and the flow rate of said gaseous mixture being selected whereby a residence time of from 3.5 to 15 seconds for said gaseous mixture to be in the presence of said packing material is maintained.

2. The apparatus of claim 1, in which said packing material is arranged as a packed bed 6 to 12 feet in height.

* * * * *